United States Patent [19]

Thompson-Rohrlich

[11] Patent Number: 5,677,710
[45] Date of Patent: Oct. 14, 1997

[54] RECOGNITION KEYPAD

[75] Inventor: John Thompson-Rohrlich, Santa Fe, N. Mex.

[73] Assignee: Apple Computer, Inc., Cupertino, Calif.

[21] Appl. No.: 60,577

[22] Filed: May 10, 1993

[51] Int. Cl.$^6$ .................................................. G09G 5/00
[52] U.S. Cl. ........................................ 345/173; 345/119
[58] Field of Search ................................ 345/156, 173, 345/179, 145, 146, 115, 116, 118, 119; 382/13, 59; 364/705.03, 705.06, 709.11; 395/340, 343, 347, 352, 354, 358

[56] References Cited

U.S. PATENT DOCUMENTS

| | | | |
|---|---|---|---|
| 5,063,600 | 11/1991 | Norwood | 382/13 |
| 5,252,951 | 10/1993 | Tannenbaum et al. | 345/173 |
| 5,347,295 | 9/1994 | Agulnick et al. | 345/179 |

FOREIGN PATENT DOCUMENTS 2193827  2/1988  United Kingdom .

OTHER PUBLICATIONS

Mettandwriter, Version 1.0, User Guide, 1993.

*Primary Examiner*—Chanh Nguyen
*Attorney, Agent, or Firm*—Hickman Beyer & Weaver LLP

[57] ABSTRACT

A method and apparatus for inputting data to an active application program running on a computer system includes the steps of displaying the image of a recognition keypad on a screen of the computer system, the keypad being adapted to receive user inputs; analyzing the user inputs to the recognition keypad; and inputting data to an application program running on the computer system based upon the analysis of the user inputs. The recognition keypad includes at least one button and a recognition area having at least two recognition modes. Preferably, the user inputs include inputs from a pointing device, and the recognition modes include a command mode and a character mode. The user preferably enters characters and gestures to the recognition area, and the buttons are preferably modifier buttons operative to modify the entered characters and gestures based on the current recognition mode.

29 Claims, 14 Drawing Sheets

RECOGNITION KEYPAD

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware ("pen") computer system. A pen-based computer system is typically a small, hand-held computer where the primary method for inputting data includes a "pen" or stylus. A pen-aware computer system is one which has been modified to accept pen inputs in addition to traditional input methods. A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke is defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

Typical computer systems using GUI have typically been implemented using keyboards and pointing devices such as mice, trackballs, and the like for data input. Pen-based computer systems, in contrast, tend to discourage the use of a keyboard. Most of the software written for pen computers is designed to function well with pen strokes and "clicking" the stylus against the computer screen in defined areas. In addition, a primary feature of many pen computer systems is their portability, which a keyboard, if included with the pen system, would seriously degrade.

In some instances, however, the need arises on a pen-based computer for data entry in a keyboard-like fashion. For example, the pen-based computer might be running a program that normally accepts characters from a keyboard. Also, in some cases, the only way to enter data efficiently might be to use a keyboard-like input device.

In particular, a need might arise on a pen computer to enter a command or character that is normally or most efficiently executed with keystrokes on a keyboard-based system. Commands are simple, usually one character, instructions for an application program to execute a particular function. For example, in virtually all Macintosh word processing systems, a ⌘S (where the ⌘ signifies "command") command will save the current document to a hard disk or other storage device. Such commands are conveniently entered in a keyboard-like fashion.

In many current GUI computer systems, commands for an application program may be executed by several methods, including pull-down menu commands and keyboard commands. For example, the ⌘S command for a word processing program might be implemented by either selecting the SAVE option from a pull-down menu or by pressing a key or keys from the keyboard.

In general, such keyboard entry of commands can be more efficient than selecting a command through a menu. A two-keystroke action generally is faster and easier than moving a pointing device to the top of a screen and searching for a particular command in a menu. Also, some users are more familiar with keyboard commands, and may find using menu commands time consuming and inefficient.

In some pen computer systems, such keyboard-like entry of commands can be accomplished using a keyboard image displayed on the screen of the pen computer. The keyboard image resembles a standard keyboard, and keys are selected using a stylus. Most keyboard commands and characters can be entered in this fashion. However, utilizing such an on-screen keyboard is still relatively time consuming and inconvenient.

In current pen software, commands for a program can be entered through specific interfaces written for that program. For example, in the PenPoint operating system by Go Corporation, a command can be applied to text characters in a word processing program by writing a special gesture directly over a selected word or text line. However, these commands are only applied to the selected word or text line. Also, each application program requires its own pen command interface, which increases the complexity and difficulty of using the computer system for the user.

In a pen software system called MacHandwriter II by Communication Intelligence Corporation, several characters may be entered in boxes to form characters or words. A button can then be selected to modify the characters entered and send the character or word to an application program. However, it does not include a method for entering and inputting a single character easily and quickly.

What is needed is a utility program that allows the user to input commands and characters to any currently-running application program. The utility should be able to be used about as quickly as a keyboard and should correspond to the keyboard commands and characters used on keyboard computer systems.

SUMMARY OF THE INVENTION

A recognition keypad of the present invention permits quick, straightforward input of commands and characters to an application program running on a pen computer system. The keypad can be displayed and used at any time to enter commands, characters, and gestures into an active application program.

A method for inputting data to an active application program includes displaying an image of a recognition keypad on a computer screen, where the keypad has at least one button and at least one recognition area. The recognition area includes at least two recognition modes. The method further includes analyzing user inputs to the recognition keypad, and inputting data to an application program running on the computer system based upon the analysis of the user inputs.

Two preferred recognition modes for the recognition area include a character mode, wherein a character or gesture is input to the application program, and a command mode, wherein a command is input to the application program. These modes are preferably controlled by one of the buttons. Alternate embodiments of the invention include a step of confirming the character or gesture entered by the user, and a step of inputting a character to the application program from the selection of a button.

A recognition keypad in accordance with the present invention includes a central processing unit (CPU), a screen coupled to the CPU, a pointer mechanism coupled to the CPU to provide user inputs which can be displayed on the screen, a recognition keypad displayed on the screen having at least one button and at least one recognition area and being adapted to receive user inputs on both the button and the recognition area, a mechanism for analyzing user inputs to the recognition keypad, and a mechanism for inputting data to an application program running on said computer system based upon the analysis of the user inputs. Preferably, the user inputs include inputs in the form of a character or gesture, and two recognition modes of the recognition area include a character mode and a command mode controlled by a button. The character mode inputs a character to the application program, and the command mode inputs a command to the application program, the command depending on the modifier buttons selected. Other more complex forms of the present invention include an extension pad button area with additional character buttons and a confirm button area.

The present invention allows quick input of commands to an active application program using pointer-based inputs. The recognition keypad is small and is preferably always active on the screen, allowing quick and easy command and character entry from the keypad to any active application program window.

These and other advantages of the present invention will become apparent upon a reading of the following descriptions and a study of the various figures of the drawing.

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware ("pen") system.

Figure 1:
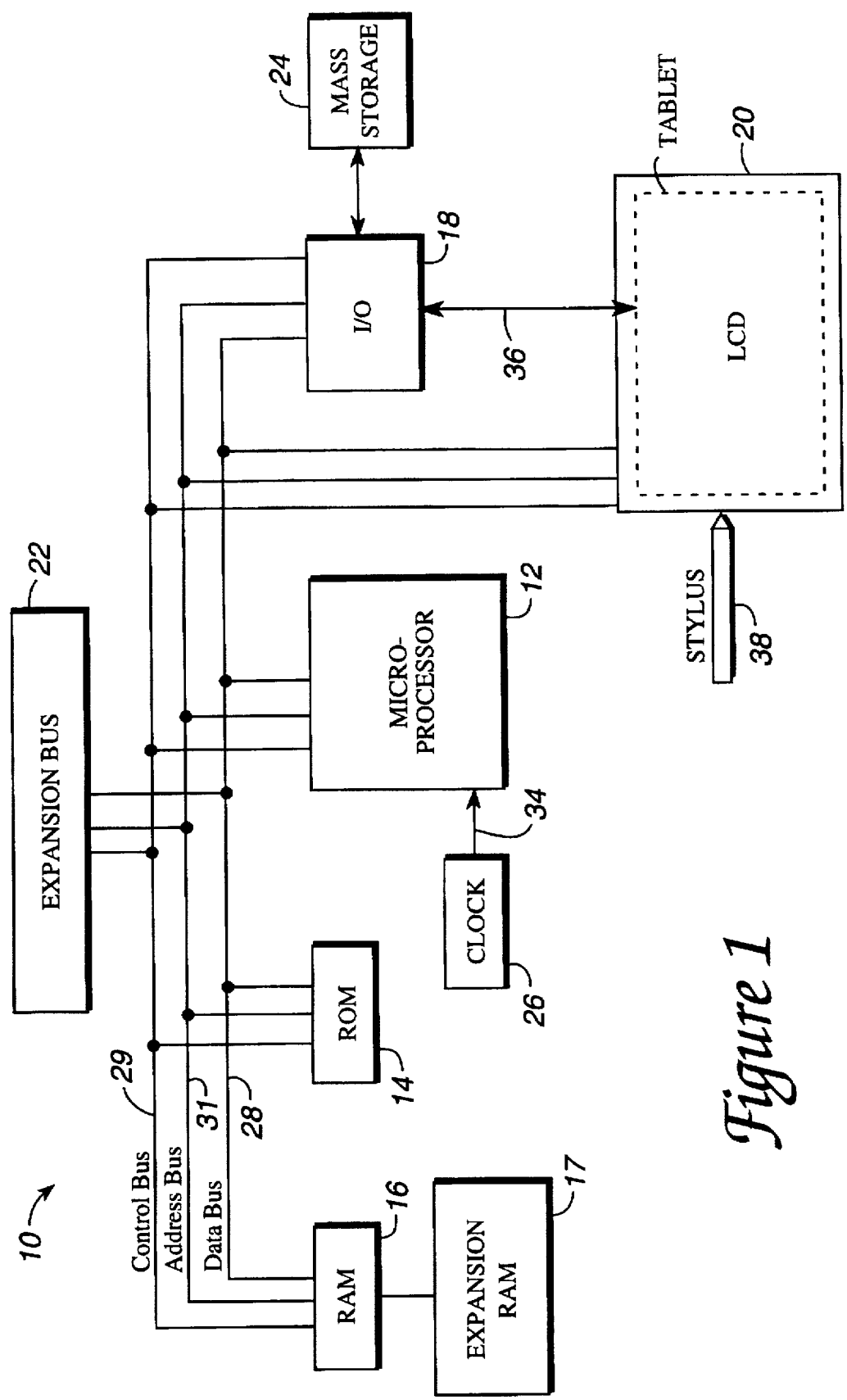
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 can be a thin, clear membrane which covers the LCD display and which is sensitive to the position of a stylus 38 on its surface. Alternatively, the screens can be provided with an embedded RF digitizer and an "active" RF stylus. There are also other types of confirmation screen/tablet technologies. Combination display assemblies such as display assembly 20 are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointer", "pointing device", "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 could be provided with a backup battery to prevent the loss of data even when the pen computer system 10 is mined off. However, it is generally desirable to have some type of long term storage 24 such as a commercially available miniature hard disk drive, non-volatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2A:
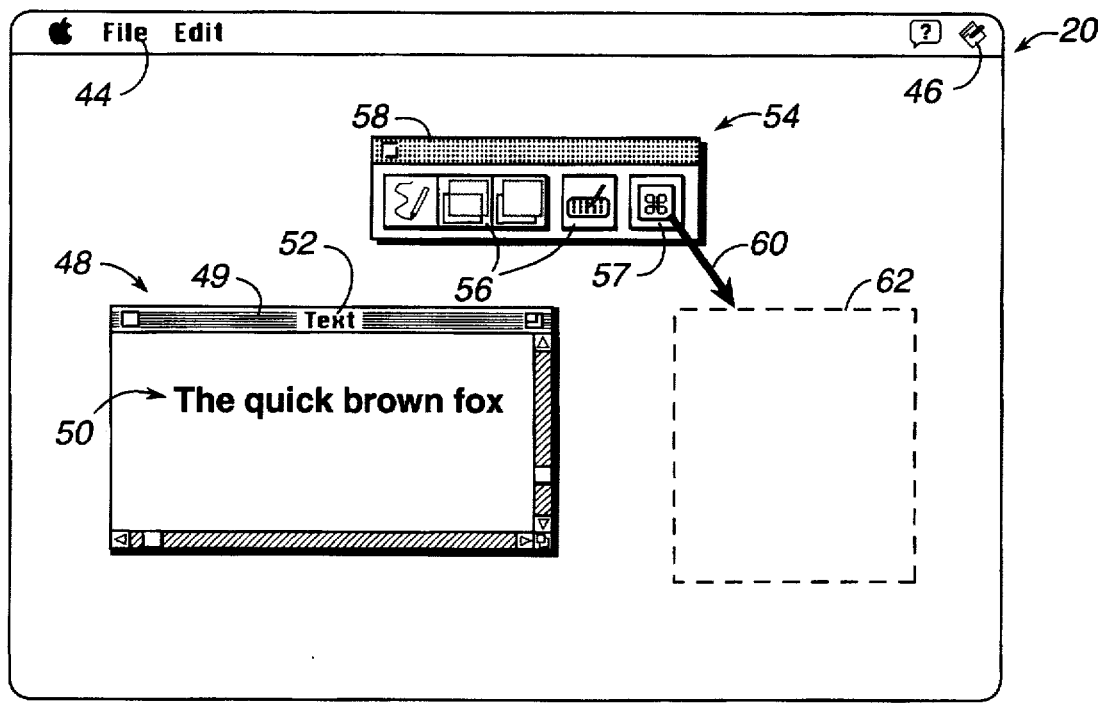
FIG. 2a is a display screen of the computer system of FIG. 1 showing a word processing application window and illustrating the activation of a recognition keypad of the present invention.

In FIG. 2a, a display screen 20 of a computer system is shown. In the preferred embodiment, screen 20 is the LCD input/output display of the pen computer system shown in FIG. 1. A display from an Apple Macintosh System 7.0 operating system environment is shown as an example; however, any graphical user interface (GUI) used on a computer capable of running such an environment is applicable to the present invention. Menu titles 44, when touched with a pointing device, will display pull-down menus, which include selections that can be activated with the pointing device. Icon 46 indicates which application program in memory is currently "active" (see below).

Window 48 is displayed by a currently active application program. A window, such as window 48, may be moved on the screen, erased ("closed"), or resized at the user's convenience, as is well-known to those skilled in the art. In FIG. 2a, window 48 is displayed from a word processing application program, Teach Text, in which text fries may be input, output, or edited. As referenced herein, "application program" refers to programs such as word processors, spreadsheets, drawing programs, etc. that can run under a GUI environment.

Icon 46 and lines 49 indicates that Teach Text is the currently active application program. Herein, an "active" application program is one whose open window can be manipulated, edited, moved, etc. For example, a word processing program window, such as window 48, is active if the text that the word processor window displays can be changed or edited; the active word processing window can also be dragged, resized, or closed by clicking on specific areas of the window. In contrast, non-active program windows cannot be manipulated unless they are made active (usually by clicking on them or selecting them from a menu). A non-active window does not display lines 49 and does not display an icon 46. In the preferred embodiment, only one program window may be active at once, although alternate embodiments can support multiple active windows, where one of the active windows is designated as the "input" window.

Line of text 50 in window 48 has been entered and saved in a file "Text", as indicated by display 52. Text 50 may be changed or edited by placing a cursor on the line 50 with a pointing device and entering or deleting characters from, for example, a keyboard.

A "gadget bar" 54 is also displayed on display screen 20. Gadget bar 54 is displayed by a utility that offers a selection of utilities for a computer system. These programs are represented by icons 56, and are typically grouped according to related functionality. Gadget bar 54 is a form of "palette"; dotted bar 58 indicates this status. Gadget bar 54 (like other palettes) may be closed, dragged, or used freely at any time, regardless of any active window, such as window 48. In the preferred embodiment, gadget bar 54 is implemented using the Penboard software system, described in U.S. Pat. No. 5,603,053, filed Mar. 5, 1996, entitled, "System for Entering Data Into an Active Application Program Currently Running in the Foreground by Selecting an Input Icon in a Palette Representing Input Utility", which is a continuation of U.S. patent application Ser. No. 08/060,438, filed May 10, 1993 on behalf of Cough et at. entitled "Method and Apparatus for Interfacing with a Computer System", now abandoned, both assigned of the assignee of the present application, the disclosure of which is hereby incorporated by reference herein in its entirety.

Arrow 60 illustrates the activation of a utility from gadget bar 54. A pointing device selects a desired icon 56 and preferably drags the icon to the screen location at which the utility program window will be displayed. "Dragging" an icon with a mouse is typically accomplished by holding down the selection button on the pointing device, then releasing the button after the object has been moved to its new location. "Dragging" with a pen or stylus involves engaging the icon with the stylus and moving the stylus to the desired position on the screen. The stylus is then lifted from the screen to leave the icon in its new position. In FIG. 2a, the icon 57 for the recognition pad has been selected and dragged as suggested by arrow 60. Preferably, after the icon is dragged off of bar 54 it is converted into a phantom window 62. A recognition pad window will be displayed at the location of phantom window 62.

Figure 2B:
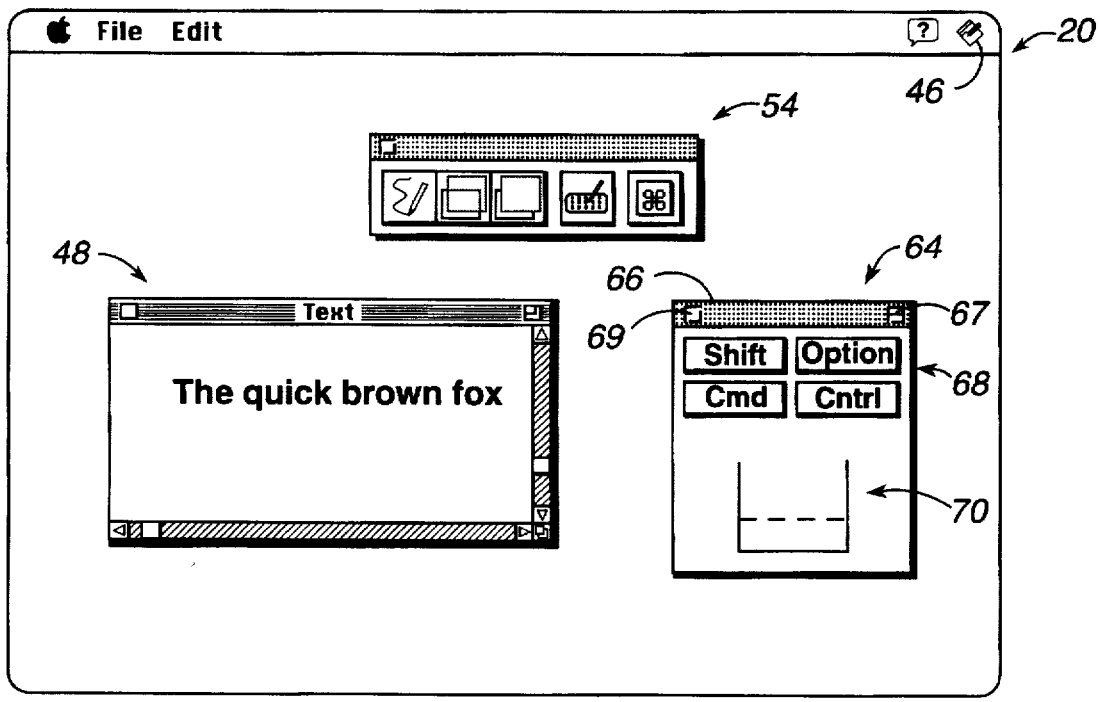
FIG. 2b is a display screen as shown in FIG. 2a showing the recognition keypad of the present invention.

In FIG. 2b, a recognition keypad 64 of the present invention appears in place of phantom window 62 of FIG. 2a when the stylus is raised from the screen. Recognition keypad 64 is preferably a small enough size to be located in a seldom-used area of the screen and not interfere with the active application program. Recognition keypad 64 includes a header bar 66, buttons 68, and a recognition area 70. Header bar 66 has a dotted pattern, indicating that the recognition keypad 64 is a palette and always active, similar to gadget bar 54. That is, the buttons and functions of keypad 64 may always be selected by a pointing device, regardless of the active status of window 48 or any other application window. Icon 46 indicates that word processing window 48 is still active as well; text and functions of the window 48 may still be manipulated freely at any time. The keypad 64 may be dragged to any location on the screen by engaging header bar 66 with a pointing device. Header bar 66 includes a close box 69 that can be used to remove the keypad image 64 from the screen. Header bar 66 also includes a pad extension button 67 that, when selected by a pointing device, will display a pad extension with additional buttons and functions. The function of the button 67 is explained in more detail below.

Buttons 68 may be selected by a pointing device and preferably are equivalent to like keys on a typical keyboard. In the preferred embodiment, buttons 68 are "modifier" buttons; that is, on a keyboard, they are designed to modify the function of another key when pressed simultaneously with that other key. Modifier buttons and keys can also modify the selection of a pointing device when pressed simultaneously with the pointing device button. Modifier buttons are often used, for example, to invoke a command. In the preferred embodiment, the buttons 68 include "SHIFT", "OPTION", "COMMAND" and "CONTROL". For example, the button "OPTION" is normally used on a keyboard by holding down the OPTION key and pressing a second key simultaneously. The OPTION key modifies the function of the second key. For example, "OPTION-S" signifies that both the OPTION and S keys are pressed simultaneously; this combination may have the effect of, for example, deleting a paragraph of text in a word processing document. Other functions and commands typically executed by modifier keys include saving or loading a word processing document to and from a mass storage device, saving or loading data to and from buffer RAM ("cutting and pasting"), closing an active window, inserting and deleting text, printing a file, searching for text or filenames, etc. Examples of the use of buttons 68 using a pen computer system are described below.

Recognition area 70 is used to enter characters and gestures to the keypad 64 by means of a pointing device. Recognition area 70 is receptive to pen strokes and displays such strokes graphically (i.e. in "ink") as they are being drawn. When the user lifts the pointing device from the recognition area 70 for a predetermined period of time, the CPU 12 assumes that a character or gesture has been completely entered, and attempts to recognize the strokes as an alphanumeric character or predefined gesture. Recognition software for recognizing such characters or gestures is well-known to those skilled in the art. The character or gesture entered is combined with any modifier button(s) 68 currently selected, and the resulting command is input to and executed in the active window 48. If none of the buttons 68 have been selected, the recognized character or gesture is input to the active window 48 as a character. These processes are described in more detail below.

Figure 3:
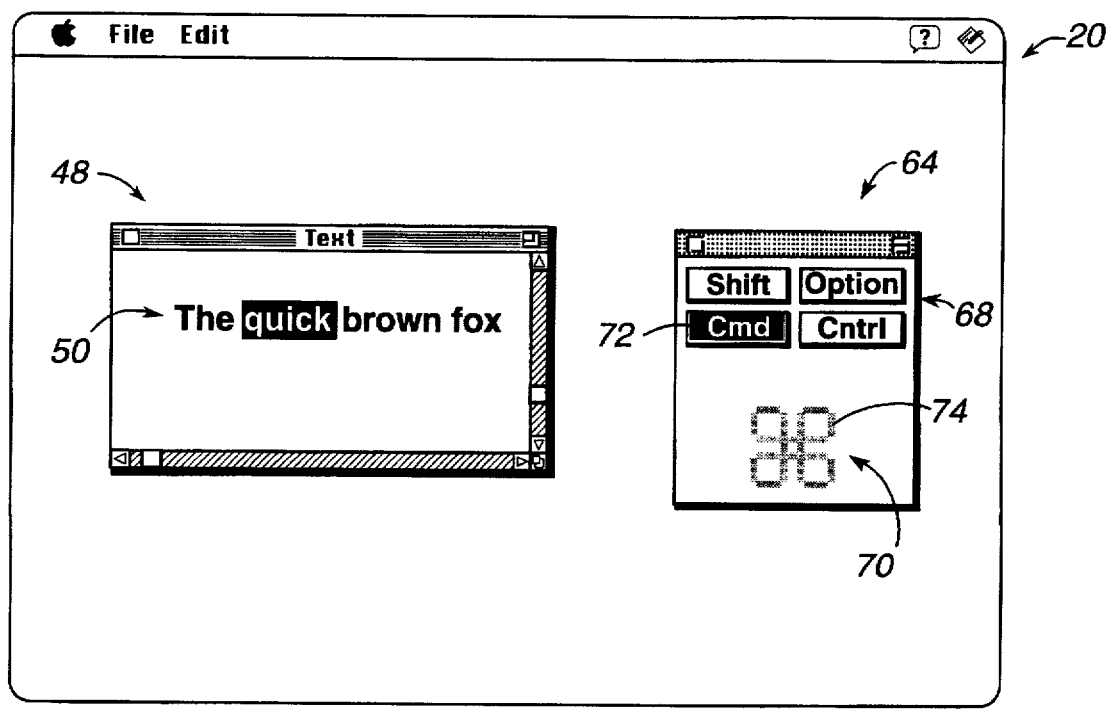
FIG. 3 is a display screen showing the selection of a word in the word processing window and the selection of the command button of the recognition keypad.

In FIG. 3, active word processing window 48 and recognition keypad 64 are displayed on screen 20. In active word processing window 48, the word "quick" in text line 50 has been selected by the user with a pointing device or by some other selection mechanism, and is thus shown in reverse video in FIG. 3. The word "quick" will thus be modified or changed, depending on the user's next action or "event".

Recognition keypad 64 is shown with the "CMD" ("COMMAND") button 72 selected; i.e., "CMD" is in reverse video. This indicates that the recognition keypad 64 is in command mode: a character or gesture entered in recognition area 70 will be modified by the CMD key. Symbol 74 is displayed in recognition area 70 to indicate that the keypad is in command mode. Depending on the computer system used, different symbols may be associated with specific modifier buttons. In the preferred embodiment, recognition keypad 64 is always opened with command mode selected.

Buttons 68, such as the COMMAND button, may be selected by a pointing device. The buttons may be selected with one click or tap, meaning that the pointing device has contacted the computer screen once on the button 68 and has been removed. A single click sets the selected button in a "set" state, in which the modifier button modifies the next character or gesture entered in recognition area 70. The modifier button 68 preferably automatically deselects after the next character or gesture has been entered into the recognized area. Buttons 68 may also be selected by clicking on the buttons twice, which, in the preferred embodiment, sets the selected modifier button to a "lock" state, so that the button always stays selected until the user clicks on it again at a future time. In the preferred embodiment, "set" state highlights the button on the computer screen as shown in FIG. 3. "Lock" state can be shown similar to the "set" state, or it can be distinguished from the "set" state with, for example, a different color or a border around the modifier button 68.

Figure 4:
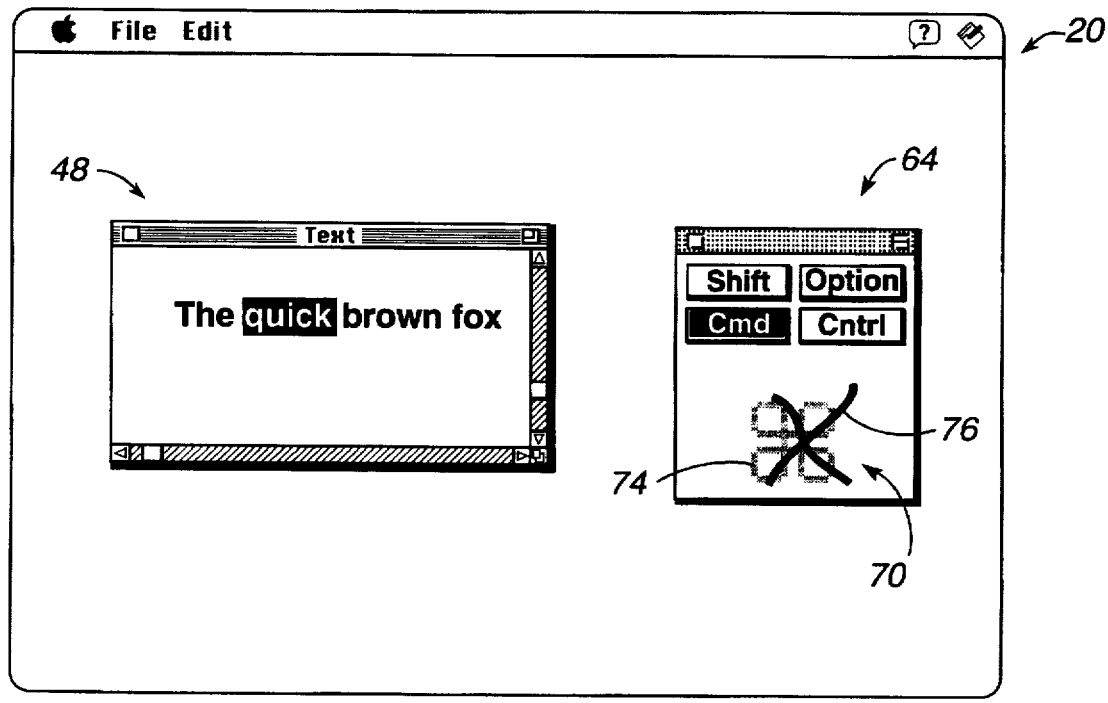
FIG. 4 is a display screen showing a pen-written command entered upon the recognition area of the recognition keypad.

In FIG. 4, written character 76 has been drawn in recognition area 70 with a pointing device. Written character 76 is displayed with graphical lines of a predefined width that most closely follow the strokes of the pointing device, i.e., it is displayed as "ink". As shown in FIG. 4, the character drawn most closely resembles an "X" or cross.

Gestures may also be written in recognition area 70. Such gestures may be predefined; for example, an arrow pointing to the left might be defined to represent a printer control character, such as a RETURN character. Or, a gesture may represent a command, in which case commands could be entered without selecting the CMD button and keeping the keypad in character mode (character mode is detailed with reference to FIG. 6a).

Figure 4A:
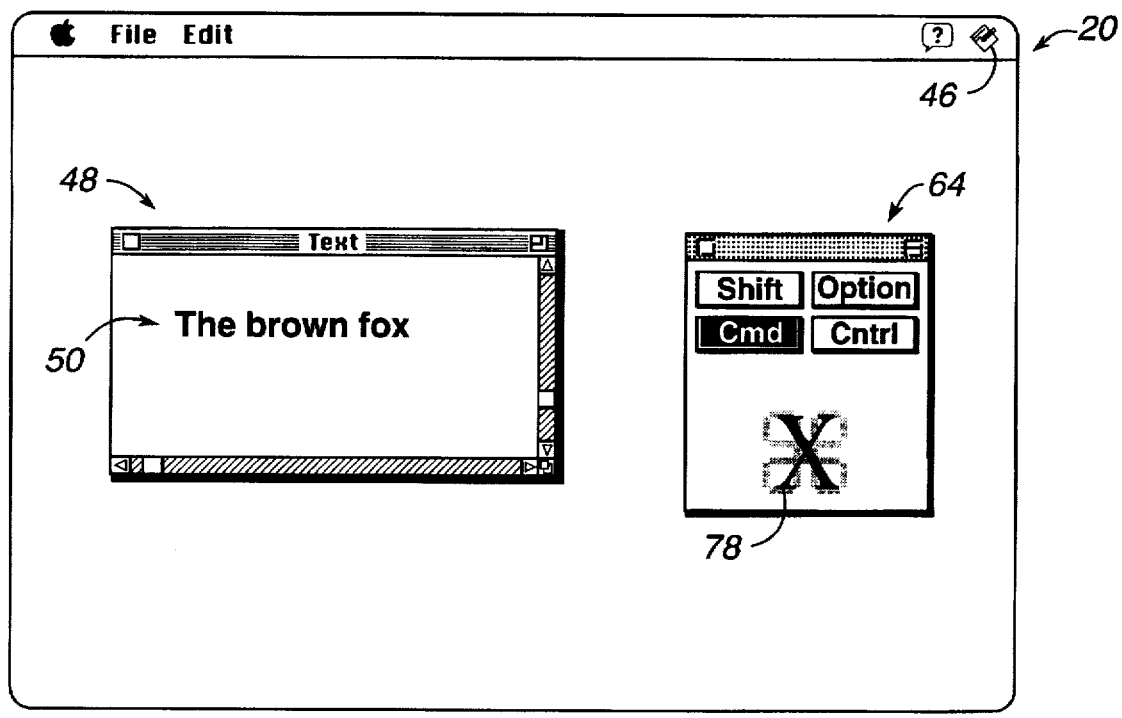
FIG. 4a is a display screen showing a computer-printed character that the computer recognized.

In FIG. 4a, written character 76 of FIG. 4 has been recognized as an "X" by the recognition software of the computer system. Recognition software is well-known to those skilled in the art. CPU 12 displays the recognized character 78 in place of the written character 76 in the recognition area 70 of keypad 64. Thus, in the example shown, the command "CMD-X" was recognized by the CPU. If the recognition software recognized a different character, that recognized character would be displayed in recognition area 70. The user thus receives quick visual feedback on the character that the CPU 12 recognized.

Word processing window 48 in FIG. 4a shows the result of the command entered in recognition keypad 64. CPU 12 sends the command entered in the keypad 64 to the currently active window 48. The command is then interpreted by the active program as it normally would if input by a keyboard. In FIG. 4a, the active window 48 received the "CMD-X" instruction from the CPU 12. For the Teach Text program, "CMD-X" is an instruction to "cut" the selected text, i.e. to delete it and store it in buffer RAM. Since "quick" was selected in the Teach Text window 48, "quick" was deleted from text 50. If a different application program window had been the active window (i.e., a different icon 46 displayed on the screen 20), the command might have been interpreted differently. For example, in a word processing program, the command "CMD-S" might instruct the program to save the current document to disk. In contrast, in a mail program, the command "CMD-S" might instruct the mail program to send a mail message. The recognition keypad 64 merely sends a command to the active window; the active program interprets how to implement the command.

Figure 5A:
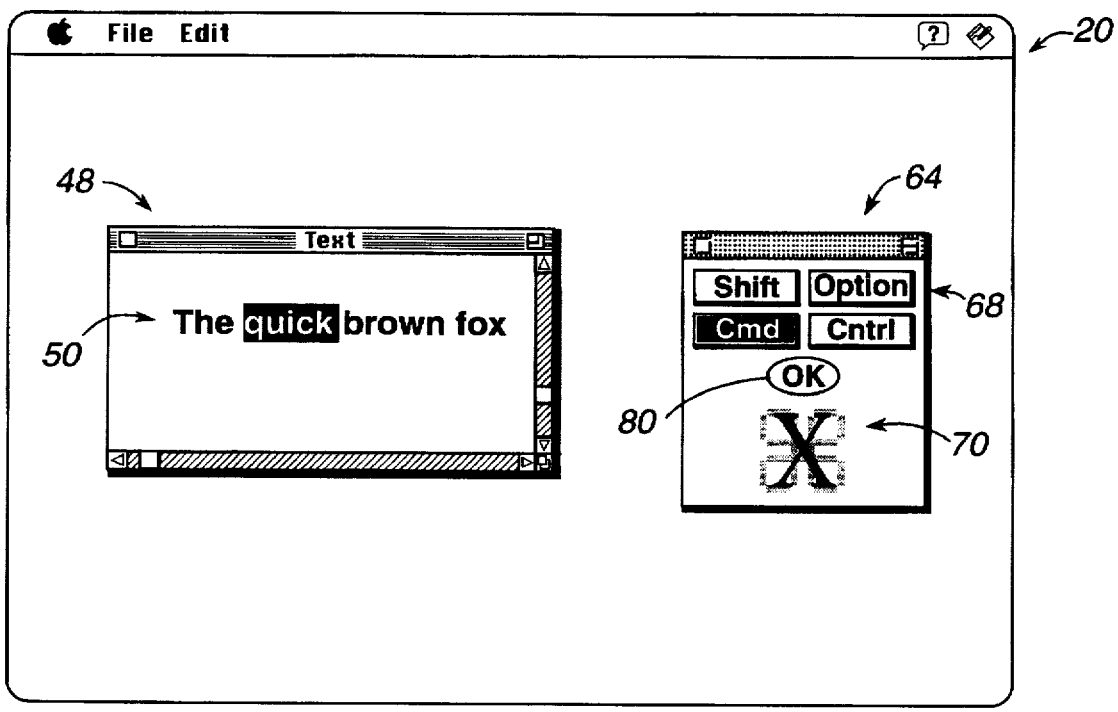
FIGS. 5a and 5b are display screens of an alternate embodiment of the invention that includes a confirmation button on the recognition keypad.
Figure 5B:
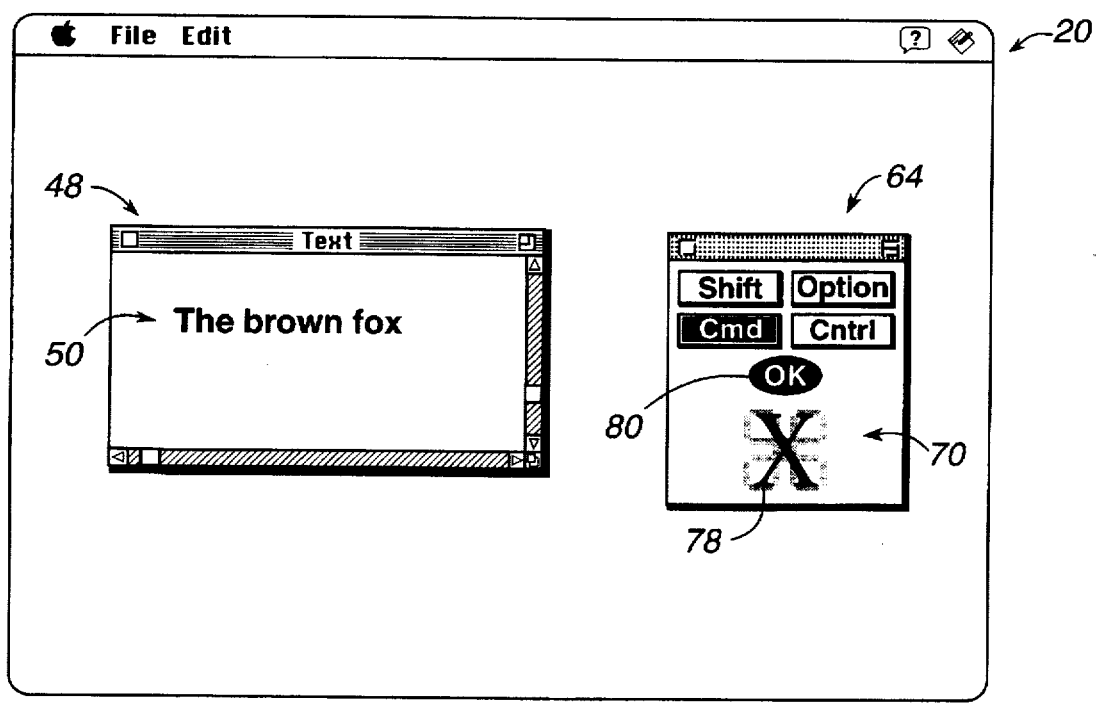

FIG. 5a illustrates an alternate embodiment of the computer implemented process of the present invention. Recognition keypad 64 includes a confirm button 80, preferably located close to the recognition area 70. After the user has drawn a character or gesture in area 70, the computer displays the recognized character 78. No command has yet been sent to the active window 48, however. If the computer recognized and displayed the correct character, the user selects confirm button 80 with a pointing device, as shown in FIG. 5b, where the "OK" is shown in reverse video. The computer then sends the command to the active window 48, and the command is implemented by the active program, i.e., the selected word is deleted in the word processing window 48. If, however, the character was not recognized correctly and the computer displays the wrong character, the user has the option to draw the character over the displayed character 78. In this case, when the pointing device touches the recognition area 70, the old character disappears and the user can try writing the character again.

Figure 6A:
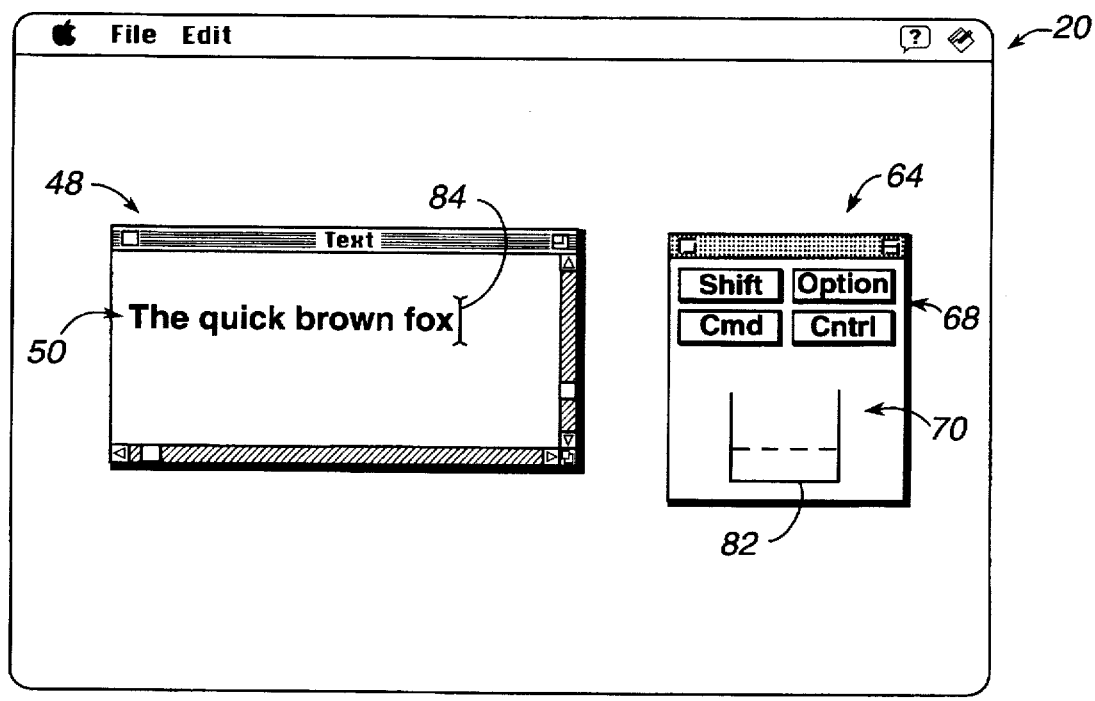
FIGS. 6a through 6e are display screens illustrating the entry of characters to the word processing window from the recognition keypad.

In FIG. 6a, the recognition keypad 64 is shown with no buttons 68 selected. Entry box 82 is displayed in recognition area 70, indicating that the keypad is in character mode. In character mode, a character or gesture may be entered in the box 82 by a pointing device, and that character or gesture is directly input to the active program window 48. Active word processing window 48 shows text line 50, with "I-beam" cursor 84 marking where the next character entered will be displayed.

Figure 6B:
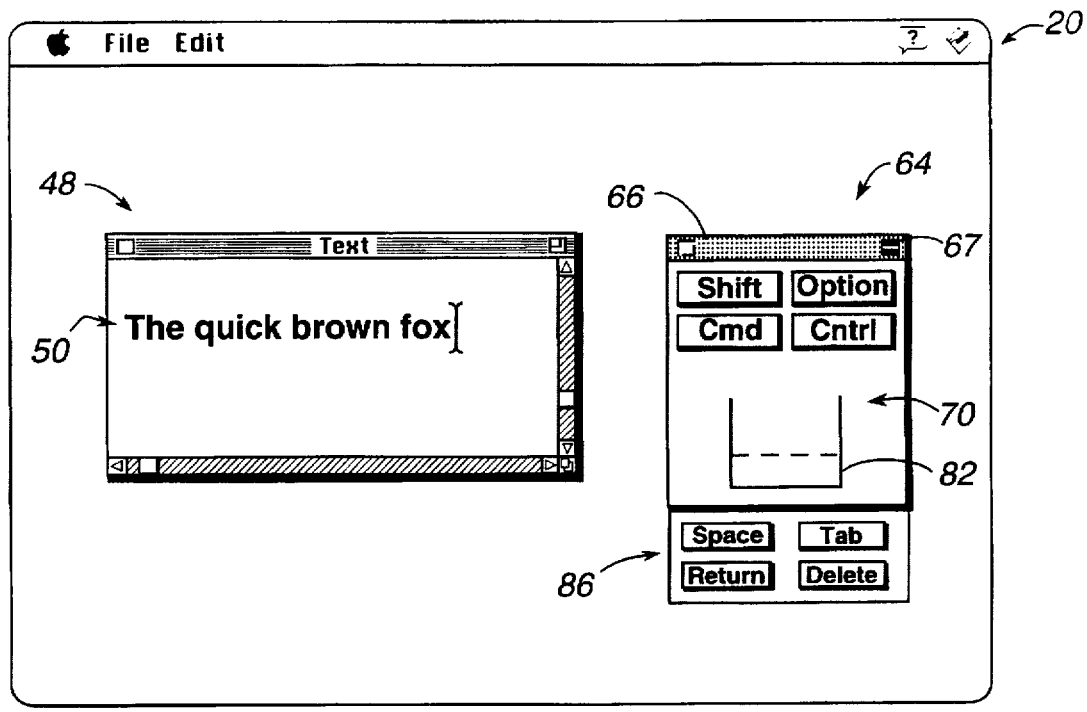

In FIG. 6b, pad extension button 67 on bar 66 has been selected by a pointing device. Extension pad 86 is displayed is response to this selection. Extension pad 86, in this example, includes extra or special characters that cannot easily be written in the entry box 82. In the preferred embodiment, such special characters include SPACE, TAB, RETURN, and DELETE buttons. Other characters may be added if necessary. The recognition software used may also be able to interpret different gestures that can be defined as these or other special characters.

Figure 6C:
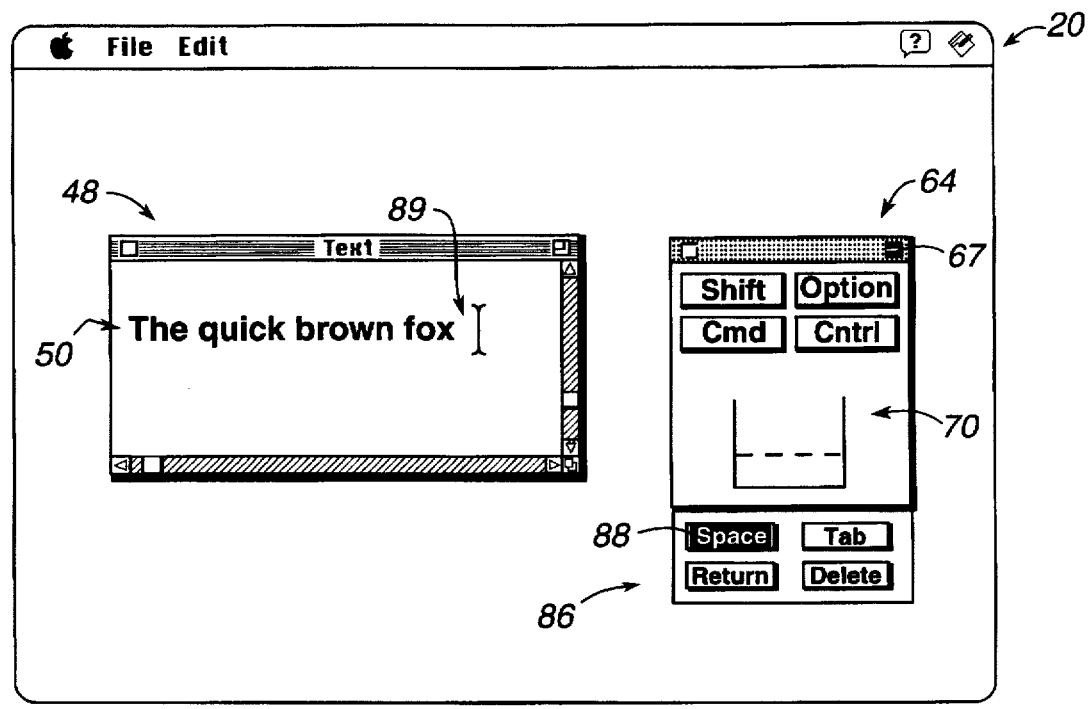

In FIG. 6c, the SPACE button 88 of extension pad 86 has been selected as indicated in reverse video, and a space 89 has been added to the text line 50. Extension pad 86 can be closed by selecting the pad extension button 67 a second time.

Figure 6D:
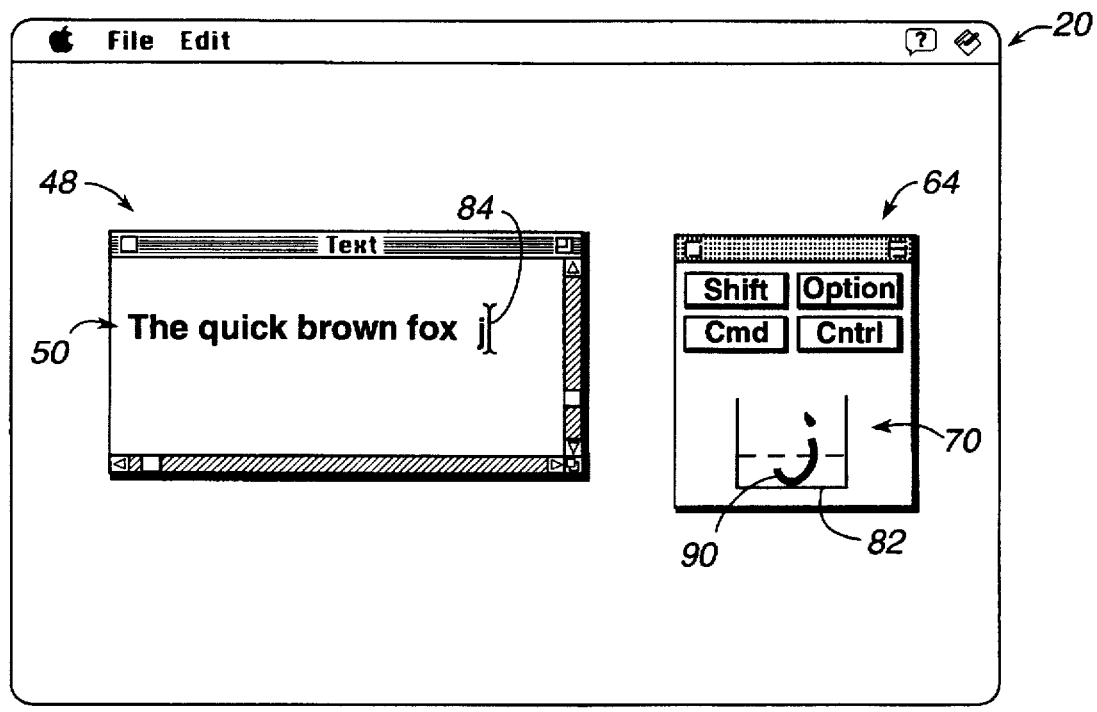
Figure 6E:
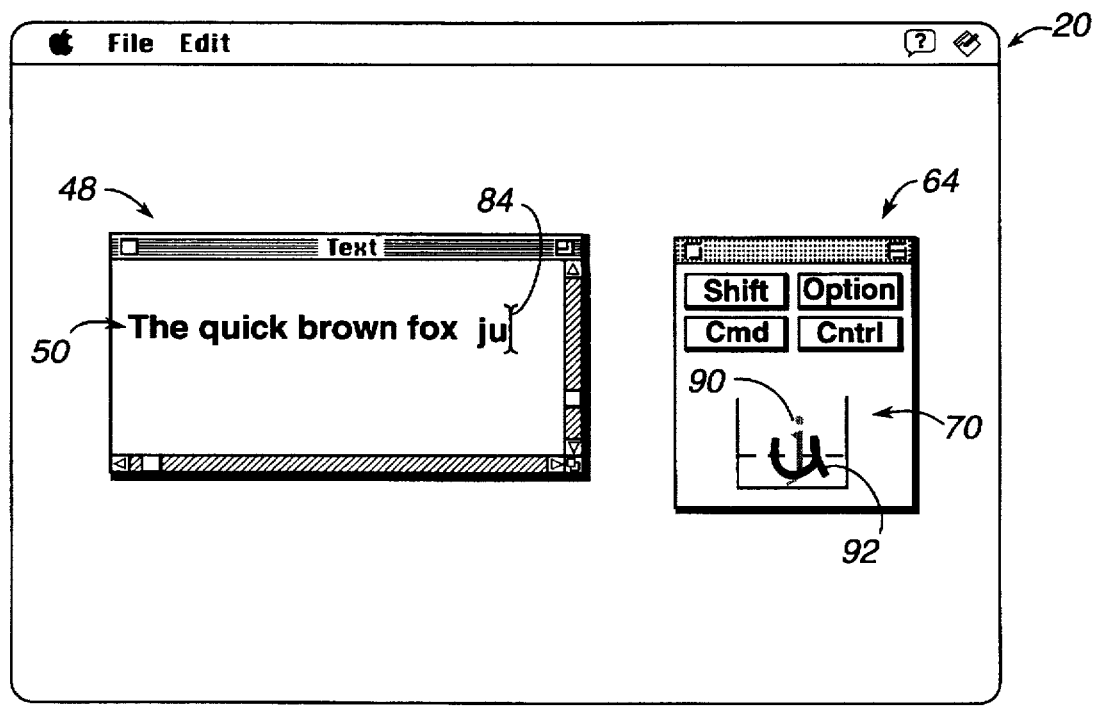

In FIGS. 6d and 6e, additional characters are added to text line 50. In FIG. 6d, a "j" character 90 has been written by a pointing device in entry box 82; the character is recognized by the recognition software and the recognized character is displayed in place of the written character (not shown). Window 48 shows a "j" character added to the text line 50, and cursor 84 indicates where the next character will be inserted. In FIG. 6e, the character "u" 92 has been added after character "j" in text line 50 by the same procedure as shown in FIG. 6d. A dimmed character "j" 90 is preferably displayed beneath the written "u"; this character is the previously-entered character, displayed for the user's convenience.

Figure 7A:
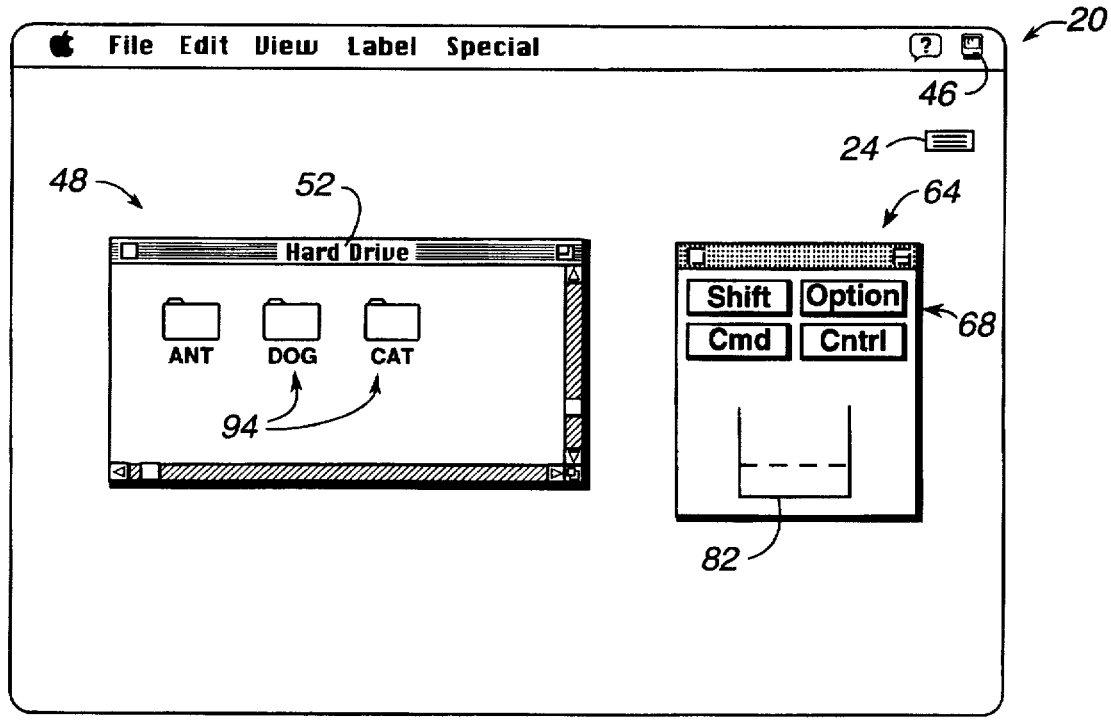
FIGS. 7a and 7b are display screens illustrating the selection of a file by entering a character on the recognition keypad.

In FIG. 7a, the active window 48 is the display of a file management program. Icon 46 indicates the active window is the Apple Macintosh program Finder. Display 52 indicates that the window 48 is displaying the contents of a hard drive 24. Files 94 displayed in window 48 are present on the hard disk. Recognition keypad 64 is shown in character mode (no buttons 68 are selected).

Figure 7B:
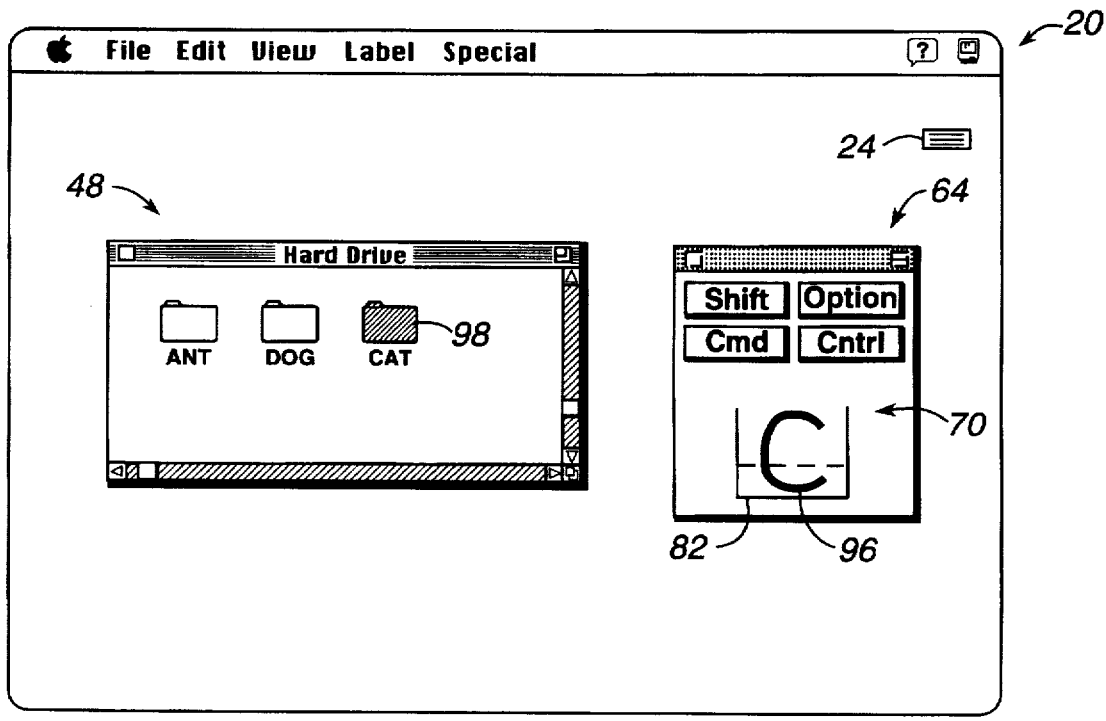

In FIG. 7b, a character 96 has been written in entry box 82. The character is recognized as a "c", and the recognized character is input to the active window 48. The active program Finder receives the "c" character and selects the first alphabetical file whose filename begins with "c"; thus, the "Cat" file 98 is selected. Finder normally selects files in this manner when a user presses a specific letter key on a keyboard.

Figure 8:
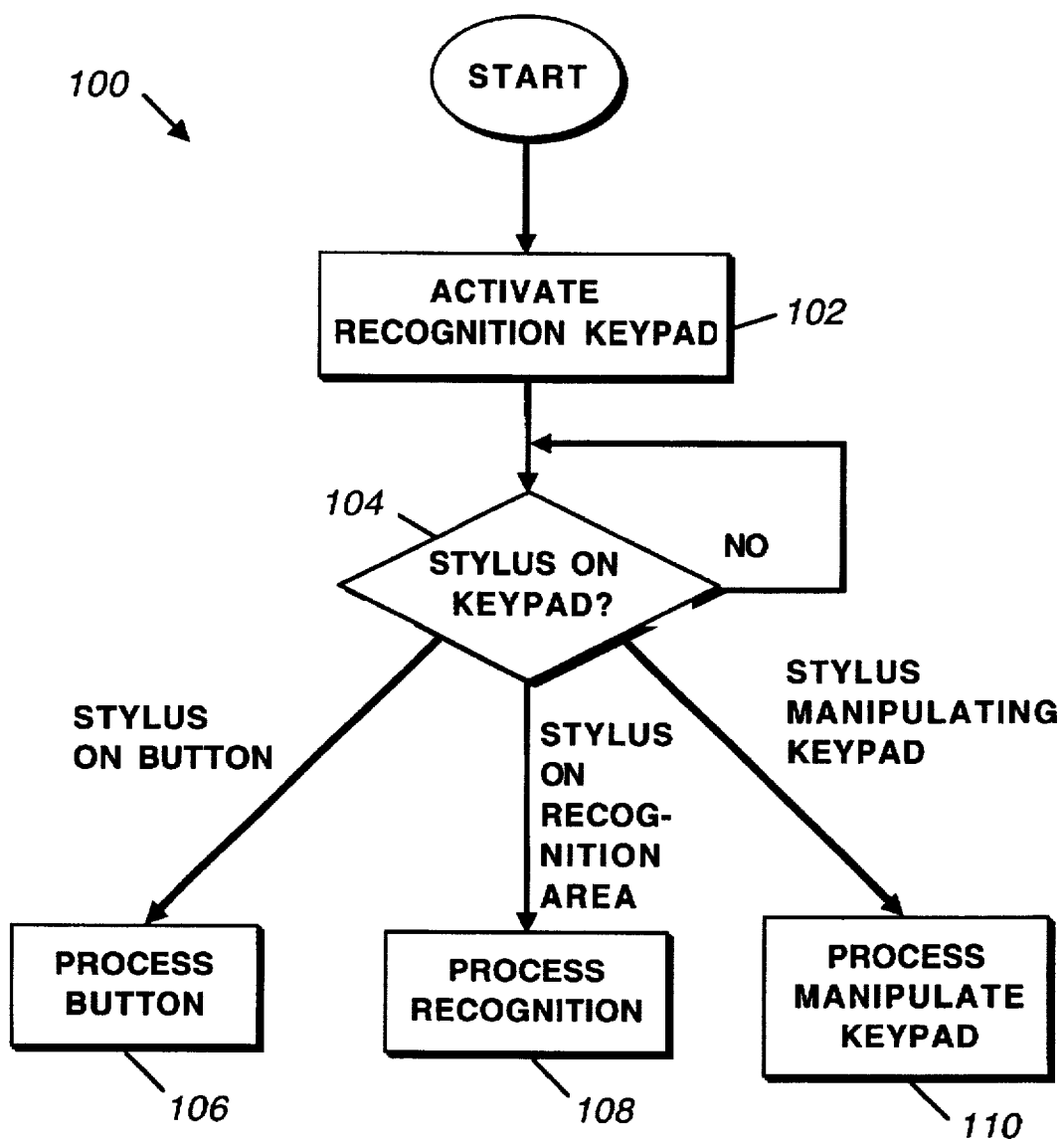
FIG. 8 is a flow diagram illustrating the method of implementing the recognition keypad of the present invention.

FIG. 8 is a flow diagram 100 of a preferred computer implemented process in accordance with the present invention. In a first step 102, the recognition keypad is activated. This is accomplished, in the preferred embodiment, as shown in FIGS. 2a and 2b, by dragging the recognition keypad icon 57 to a desired location on the computer screen with a pointing device. In step 104, the location of the pointing device (referred to as "stylus" henceforth) is determined to see if any area of the recognition keypad is being selected. If it is not selecting the recognition keypad 64, step 104 is executed repeatedly until the stylus is selecting the keypad.

If the stylus is selecting the keypad, there are several locations within the keypad that may be selected. Step 106, Process Button, is implemented if the stylus is selecting buttons 68 or 86 within the keypad. Process button is described with reference to FIG. 9. Step 108, Process Recognition, is implemented if the stylus is selecting the recognition area 70 of the keypad. Process recognition is described with reference to FIGS. 10a and 10b. Step 110, Process Manipulate Keyboard, is implemented if the stylus is selecting or activating one of the manipulation functions, such as dragging the keypad or closing the keypad. Process Manipulate Keyboard is described with reference to FIG. 11.

Figure 9:
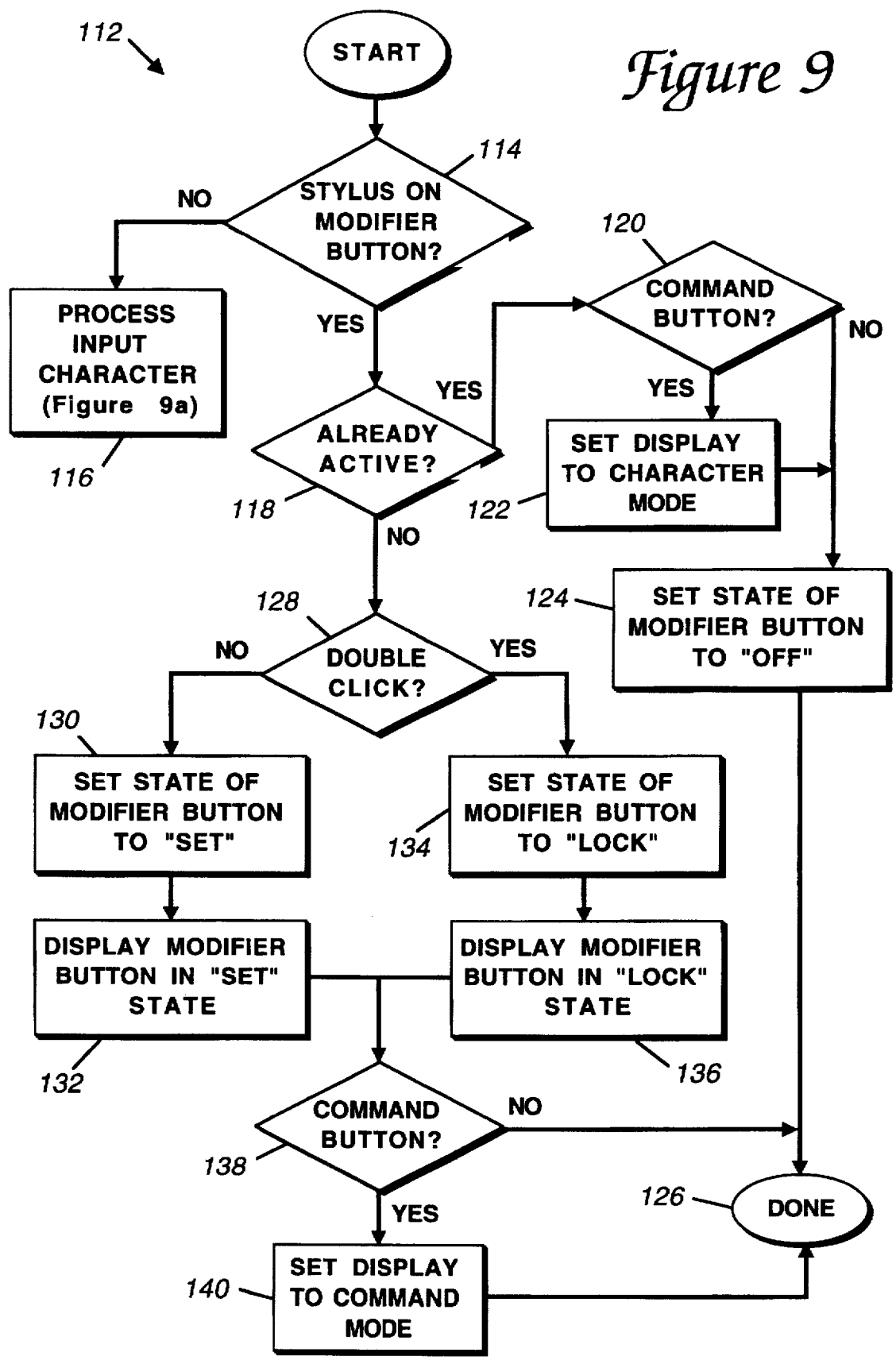
FIG. 9 is a flow diagram illustrating the "Process Button" step of FIG. 8.

FIG. 9 is a flow diagram 112 of the Process Button step of FIG. 8. In a step 114, it is determined whether the stylus is selecting a modifier button 68, which includes the SHIFT, OPTION, COMMAND and CONTROL buttons. If the stylus is not selecting a modifier button, then a character button on the extension pad 86 must have been selected and Process Input Character step 116 is then implemented (see FIG. 9a). If the stylus is selecting a modifier button, then step 118 is implemented. In step 118, the selected modifier button is checked if it is already active, i.e., if had been selected at an earlier time. If the modifier button is already active, step 120 is implemented, in which the active modifier button is checked if it is the command button. If the active button is the command button, step 122 is implemented, in which the display in the recognition area of the keypad is set to character mode; the command button has thus been toggled off. The process then moves to step 124. If the active button is not the command button in step 120, the process moves directly to step 124. In step 124, the state of the active modifier button is set to "off" and the button is unhighlighted on the computer screen. The process is then complete as shown in step 126, and the process flow loops back to step 104 of FIG. 8.

In step 118, if the selected modifier button is not already active, step 128 is implemented. In step 128, the selection status of the modifier button is checked. If the modifier button were double-clicked, step 134 is initiated, in which the state of the modifier button is set to "lock". A "double-click" is simply two, distinct clicks within a predetermined period of time. A button set in "lock" state stays selected until the user selects the button again. In step 136, the button is displayed in "lock" state on the, computer screen. If the modifier button had been clicked once or more than twice at step 128, the process proceeds to step 130, which sets the state of the modifier button to "set" and then continues to step 132, which highlights the button on the computer screen to indicate the "set" state.

Step 138 is implemented next, in which the selected modifier button is checked if it is the command button. If it is not the command button, the process is complete at step 126. If the modifier button is the command button, the command symbol, "✻", signifying command mode, is displayed in the recognition area 70 of the keypad in step 140. The process is then complete at step 126.

Figure 9A:
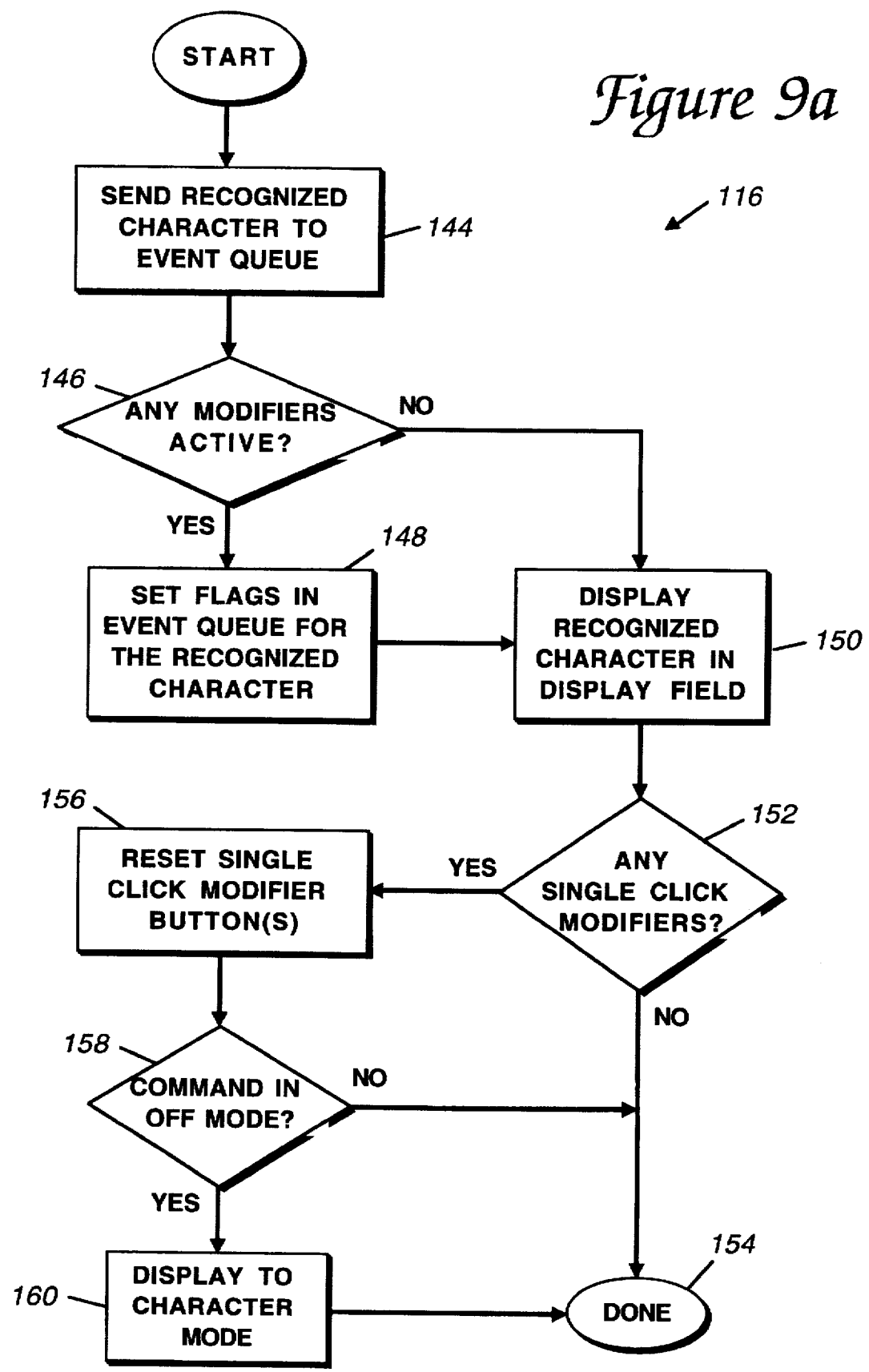
FIG. 9a is a flow diagram illustrating the "Process Input Character" step of FIG. 9.

In FIG. 9a, Process Input Character step 116 of FIG. 9 is detailed. In a first step 144, the recognition keypad sends a recognized character to the event queue of the operating system. In the preferred embodiment, the operating system is the Macintosh System 7 operating system. In this operating system, the event queue includes a list of input data "events" that were input by the user to be sent to the active application window. Each event, such as dragging a window, inputting a character, selecting a menu, etc., is placed in the event queue to be executed by the operating system in the same order the events arrived. The event queue, and the method used by Penboard to add events to the event queue, are described in the aforementioned co-pending application entitled, "Method and Apparatus for Interfacing with a Computer System" by inventors Gough et al. assigned to the same assignee as the present invention.

In step 146, the operating system checks if any modifier buttons were active at the time the recognized character was sent to the event queue. If one or more modifier buttons were active, appropriate flags are set in the event queue for the recognized character in step 148 so that the character is recognized as a command by the application program. Step 150 is then implemented, in which the recognized character is displayed in the recognition area of the recognition keypad. If no modifier buttons were active in step 146, the process continues directly at step 150, in which the recognized character is displayed on the keypad.

In step 152, any modifier buttons selected are checked if they were selected with a single click. A single click selection indicates that the button is only used to modify the next recognized character. If a single click was not used to select any modifier buttons, the process is complete as indicated in step 154. If any modifier buttons were selected with a single click, those buttons are reset, as shown in step 156. The next step 158 checks if the command mode is set to the "off" state; if it is not off, the process is complete at step 154. If the command mode is set to "off", the display in the recognition area of the keypad is set to character mode, as shown in step 160. The process is then done, as shown by step 154.

Figure 10A:
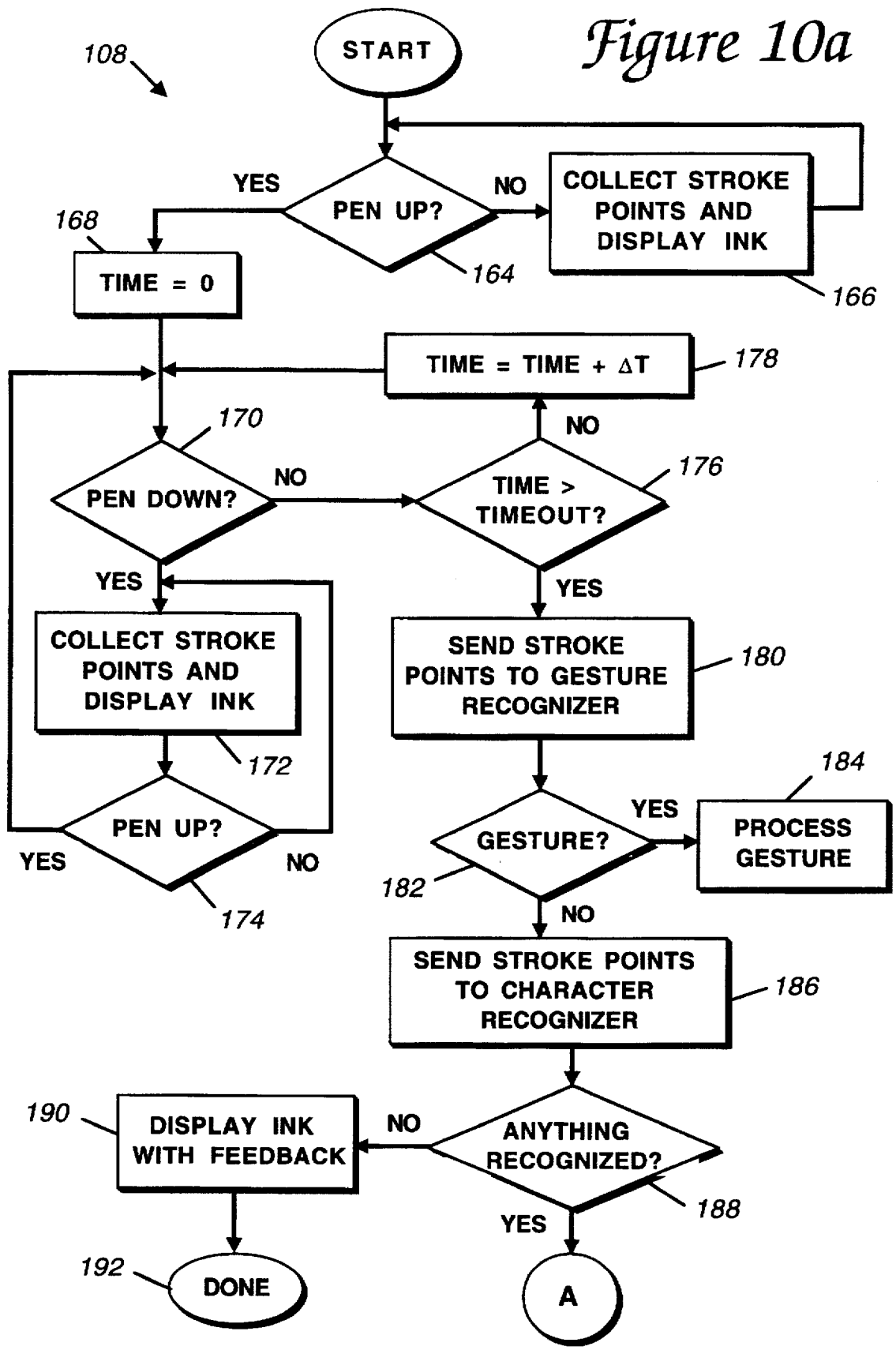
FIGS. 10a and 10b are a flow diagram illustrating the "Process Recognition" step of FIG. 8.

FIG. 10a is a flow diagram of Process Recognition step 108 of FIG. 8. In a first step 164, the stylus is checked for contact with the display screen. If the stylus is contacting the screen ("down"), step 166 is initiated, in which stroke points are collected and ink is displayed on the screen as the stylus moves across the screen surface. The process then loops back to step 164, in which the stylus is again checked for contact with the screen. Once the stylus is determined to be "up", a stroke is assumed to be complete and step 168 is initiated. In step 168, the TIME variable is set to zero, and in step 170, the stylus is checked if it is contacting the screen. If it is touching the screen, a new stroke is assumed to have begun, and step 172 is implemented to collect the stroke points and display the ink in similar fashion to step 166. Step 174 checks if the stylus is up; if it is not, the user is still entering a stroke and step 172 is cycled through once more. If the stylus is up, the stroke is completed, and the process cycles back to step 170 to check if another stroke is begun by the user.

In step 170, if the stylus is not down, a loop begins at step 176 in which the variable TIME is compared to a predefined time amount TIMEOUT. If TIME is less then TIMEOUT, the elapsed time is added to TIME in step 178 and the stylus is checked once more at step 170. If the stylus continues to be up and TIME becomes greater than TIMEOUT, the user is assumed to be finished entering his strokes and the character is completely entered. A typical time for TIMEOUT is one-half second. Step 180 is then initiated, in which the stroke points are sent to the gesture recognizer. The gesture recognizer analyzes the stroke points in step 182 to determine if the entered strokes comprise a predefined gesture; if so, the gesture is processed in step 184. If the strokes do not comprise a known gesture, the stroke points are sent to the character recognizer in step 186. If a character is not recognized in step 188, then the original strokes are again displayed in step 190 along with feedback informing the user that nothing was recognized, and the process is done in step 192. If a character is recognized in step 188, the process continues in FIG. 10b.

Figure 10B:
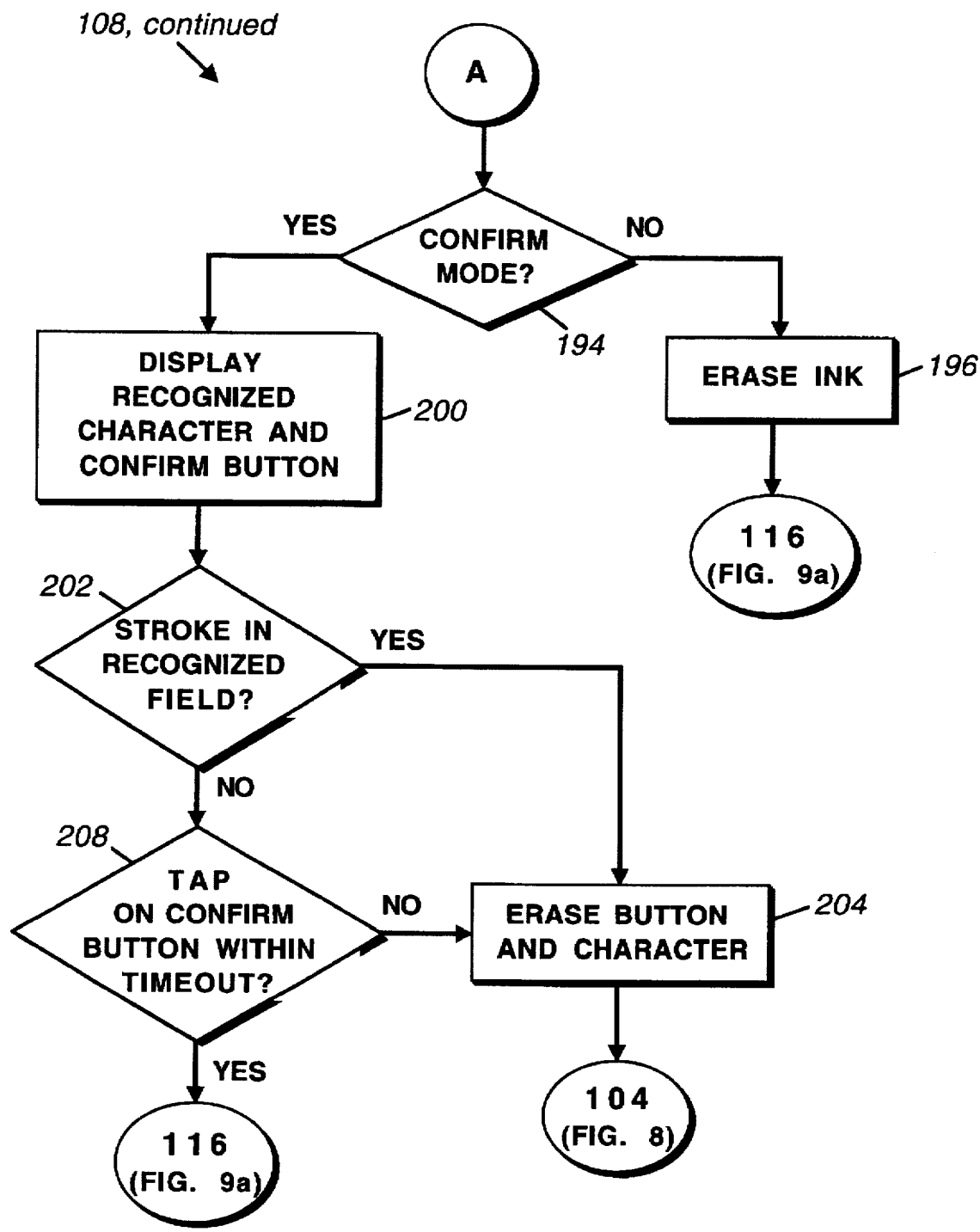

FIG. 10b continues Process Recognition step 108 begun in FIG. 10a. In step 194, confirm mode is checked if active. If not active, the displayed ink is erased in step 196 and Process Input Character step 116 (FIG. 9a) is then implemented. If confirm mode is active in step 194, then, in step 200, the ink is erased and the recognized character and the confirm button are displayed in the recognition area of the keypad. In step 202, the location of the next stroke of the user is checked. If the stroke is in the recognition area of the keypad, it is assumed that the user wishes to rewrite his strokes, and step 204 is implemented to erase the confirm button and the recognized character. The process then moves to step 104 of FIG. 8 as shown in step 206. If the next stroke of the user in step 202 is not in the recognition area of the keypad, step 208 is implemented, in which the status of the confirm button is monitored. If the user selects the confirm button within a predefined time limit, the Process Input Character step 116 of FIG. 9a is implemented. If the user does not select the confirm button within the time limit, step 204 is implemented and the process goes to step 104 of FIG. 8.

Figure 11:
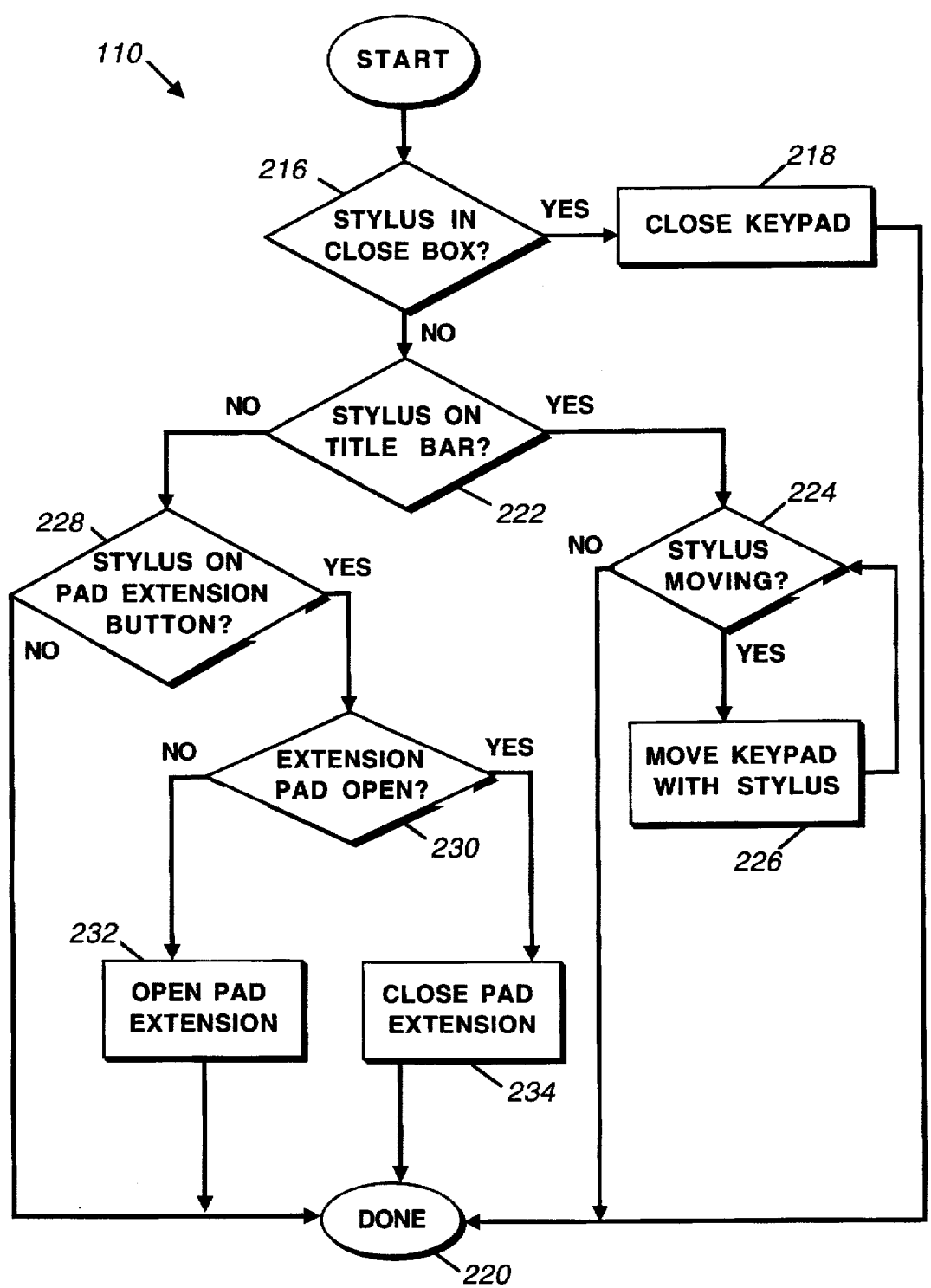
FIG. 11 is a flow diagram illustrating the "Process Manipulate Keypad" step of FIG. 8.

FIG. 11 is a flow diagram of Process Manipulate Keyboard step 110 of FIG. 8. The process starts in step 216, which checks if the stylus is selecting the close box on the keypad. If the close box is selected, the keypad is closed and erased from the screen in step 218 and the process is complete at step 220. If the close box is not selected, a step 222, checks to see if the title bar of the keypad is selected. If it is selected, step 224 checks if the stylus is moving. If the stylus is moving, step 226 moves the keypad with the stylus; if the stylus is not moving, the process is completed as indicated in step 220.

If the stylus is not on the title bar, step 228 checks if the stylus is on the pad extension button. If not, the process is complete. If the pad extension button is selected, step 230 checks if the extension pad is already open. If the extension pad is already open, it is closed in step 232. If the extension pad is not open in step 230, it is opened in step 234. After step 232 or 234, the process is complete at step 220.

Of course, the multiple decision steps 216, 222, 224, 228, and 230 can also be handled concurrently with appropriate software.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for inputting data to a computer system comprising:

displaying an image of a recognition keypad on a screen of a computer system, said keypad having at least one button and a recognition area, said keypad being adapted to receive a user selection input on said button and an indicium including one or more user ink strokes on said recognition area, said recognition area being responsive to no more than a single indicium at any one time and having a plurality of recognition modes, wherein only one of said recognition modes is active at any one time, said button being used to select which of said recognition modes is active such that when said button is in a selected state from said user selection input, one recognition mode is active, and when said button is not in said selected state, a different recognition mode is active;

recognizing said indicium including said ink strokes after said indicium has been entered in said recognition area; and inputting data to said computer system based upon said recognition mode, such that when a particular one of said recognition modes is active, said computer system receives said data as a first type of data that instructs a function to be performed in said computer system, and when a different one of said recognition modes is active, said computer system receives said data as a second type of data, different from said first type of data, that does not instruct said function to be performed in said computer system.

2. A method as recited in claim 1 wherein one of said recognition modes is a character mode, wherein said second type of data is input to said computer system as a recognized alphanumeric character when said character mode is active.

3. A method as recited in claim 2 wherein one of said recognition modes is a command mode, wherein said first type of data is a command when said command mode is active to instruct said function to be performed in said computer system.

4. A method as recited in claim 2 wherein one of said recognition modes is a command mode and said input data is input to an active window of an application program running on said computer system as a command when said command mode is active to instruct said function to be performed in said computer system, wherein said command mode is active when said button is in said selected state, and wherein said input data is input to said active window as a character when said character mode is active and said button is in said unselected state.

5. A method as recited in claim 1 wherein said indicium includes ink strokes made by a pointing device selected from the group comprising stylus, mouse, and trackball pointing devices.

6. A method as recited in claim 1 wherein said keypad includes only one recognition area, and wherein said step of recognizing said indicium includes recognizing said indicium in said recognition area as a character or gesture and inputting said recognized character or gesture based upon said active recognition mode.

7. A method for inputting data to an active window of an application program running on a computer system comprising:

displaying an active window of an application program on a screen of a computer system;

displaying a recognition keypad window on said screen separate from said active window, said keypad having at least one button and a recognition area, said keypad being adapted to receive pointer selection inputs on said button and a handwritten character including one or more pointer ink strokes from said user on said recognition area, said recognition area being responsive to no more than a single handwritten character at any one time and having a plurality of recognition modes, wherein only one of said recognition modes is active at any one time, said button being used to select which of said recognition modes is active, wherein a first recognition mode is a command mode operative to input commands to said active window and is active when said button is in a selected state, and wherein a second recognition mode is a character mode operative to input alphanumeric characters to said active window and is active when said button is in an unselected state;

analyzing said handwritten character to said recognition keypad based upon the recognition mode selected by said button, wherein said indicium is analyzed as a command in said command mode and said indicium is analyzed as an alphanumeric character in said character mode; and inputting data to said active window based upon said analysis of said handwritten character such that said inputted data is input to said active window as a recognized character modified as a command that instructs a function to be performed in said active window when said handwritten character was entered in said command mode, and said inputted data is input to said active window only as a recognized character when said handwritten character was entered in said character mode.

8. A method as recited in claim 7 wherein mode indicia indicating to said user that said command mode is active are visible within said recognition area when said command mode is active, and wherein different mode indicia indicating to said user that said character mode is active are visible within said recognition area when said character mode is active.

9. A method as recited in claim 7 wherein said step of analyzing said handwritten character includes recognizing said handwritten character to said recognition area as an alphanumeric character and acting upon said recognized alphanumeric character based upon said active recognition mode.

10. A method as recited in claim 9 wherein said step of analyzing said ink strokes includes displaying said recognized indicium in said recognition area.

11. A method as recited in claim 9 wherein said step of analyzing said handwritten character includes allowing said user to confirm said recognized alphanumeric character as correctly recognized.

12. A method as recited in claim 7 wherein said at least one button includes a predefined character button operative to input at least one predefined character to said active window without analyzing said handwritten character input on said recognition area when said user selects said predefined character button.

13. A recognition keypad comprising:

a central processing unit (CPU);

a display screen coupled to said CPU;

a pointer coupled to said CPU to provide user inputs which can be displayed on said screen;

a recognition keypad displayed on said screen, said recognition keypad comprising a button and at least one recognition area, said keypad being adapted to receive user inputs as selection inputs on said button and receive an indicium including handwritten ink strokes on said recognition area, said recognition area being responsive to no more than a single ink indicium that represents a single character or gesture at any one time and having a plurality of recognition modes, wherein only one of said recognition modes is active at any one time, said user selection inputs on said button being used to select which of said recognition modes is active, wherein a first recognition mode is a command mode, and wherein a second recognition mode is a character mode; and an analyzer responsive to said indicium made to said at least one recognition area based upon which recognition mode is active, wherein said indicium is interpreted as a command when said active recognition mode is said command mode and wherein said indicium is interpreted as an alphanumeric character or predefined gesture when said active recognition mode is said character mode, and wherein said analyzer is operative to input data to an active window of an application program running on said CPU, separate from said keypad, based upon said indicium and said active recognition mode, wherein said inputted data instructs a function to be performed in said application program when said single indicium was entered in said command mode and wherein said inputted data does not instruct said function to be performed in said application program when said indicium was entered in said character mode.

14. A recognition keypad as recited in claim 13 wherein said indicium and said user selection inputs include inputs made by a pointing device selected from the group comprising stylus, mouse, and trackball pointing devices.

15. A recognition keypad as recited in claim 14 wherein said analyzer includes a recognizer operative to recognize said indicium as an alphanumeric character or predefined gesture, wherein when said character mode is active, said recogized alphanumeric character or gesture is sent directly to be displayed in said active window as said recognized character or gesture, and wherein when said command mode is active, said recognized alphanumeric character or gesture is provided to said active window with data representing that said command mode was active when said indicium were input by said user.

16. A recognition keypad as recited in claim 15 wherein said analyzer includes a display mechanism operative to display said recognized character in said recognition area.

17. A recognition keypad as recited in claim 16 wherein said recognition area includes a confirm button which is selected before said recognized character or gesture is sent to said application program to allow said user to confirm that said indicium has been recognized correctly.

18. A recognition keypad as recited in claim 15 wherein said button is a command button having functionality equivalent to a command key on a keyboard coupled to said CPU, such that when said command button is selected and said indicium input by said user, said recognized alphanumeric character or gesture is interpreted by said application program as if said user had input said recognized character or gesture by pressing a key of said keyboard while pressing said command key of said keyboard.

19. A recognition keypad as recited in claim 13 further comprising a command symbol displayed in said recognition area when said command mode is active.

20. A recognition keypad as recited in claim 19 wherein said button is a command button.

21. A recognition keypad as recited in claim 20 wherein said command button remains selected until deselected by a user selection input.

22. A recognition keypad as recited in claim 13 further including a pad extension provided with at least one extension button, said extension button inputting a predefined character to said application window without regard to said indicium when said extension button is selected by said user.

23. A method for inputting data to an active application program comprising:

displaying an image of a recognition area and a modifier button on a screen of a computer system, said recognition area being responsive to ink strokes from said user forming no more than a single indicium at any one time, wherein said single indicium is selected from the group of handwritten gestures and handwritten characters input by a user, and wherein said modifier button is in a selected state when selected by selection inputs from said user and is in an unselected state when not in said selected state;

performing recognition on said single indicium made by a user in said recognition area to recognize said indicium as a alphanumeric character or predefined gesture equivalent to said handwritten character or handwritten gesture; and inputting said recognized character or gesture to an active window of said active application program that is separate from said recognition area, wherein said inputted recognized character or gesture is modified in accordance with said modifier button and is received by said active window as modified data if said modifier button is in a selected state, and wherein said inputted recognized character or gesture is received by said active window unmodified as said recognized character or gesture if said modifier button is in an unselected state.

24. A method as recited in claim 23 wherein said handwritten gestures include alphanumeric characters and punctuation, and wherein said single indicium is a single character, single punctuation mark, or single gesture.

25. A method as recited in claim 23 wherein said step of modifying said single indicium includes combining said recognized character or gesture with a modifier created by said selection of said modifier button and inputting said recognized character or gesture with said modifier to said active application program.

26. A method as recited in claim 25 wherein said modifier button is a command button, and wherein said inputted recognized character or gesture is modified to be and is interpreted by said application program as a command for instructing said active application program to perform a function if said command button was in an selected state when said recognized character or gesture was input to said active application program, and wherein said inputted recognized character or gesture does not instruct said function to be performed in said application program if said command button was in an unselected state when said aid recognized character or gesture was input to said active application program.

27. A method as recited in claim 23 wherein when said modifier button is unselected, said recognized character or gesture is directly displayed as said recognized character or gesture by said active application program.

28. A method as recited in claim 27 wherein said modifier button is one of the group consisting of a command button equivalent to a command key on said keyboard, a shift button equivalent to a shift key on said keyboard, a control button equivalent to a control key on said keyboard, and an option button equivalent to an option key on said keyboard.

29. A method as recited in claim 23 wherein said modifier button is equivalent to a modifier key on a keyboard coupled to said computer system, said modifier key modifying a character input to said computer system when a character key on said keyboard is pressed by said user.

* * * * *